(12) United States Patent
Anwar et al.

(10) Patent No.: US 11,755,954 B2
(45) Date of Patent: Sep. 12, 2023

(54) SCHEDULED FEDERATED LEARNING FOR ENHANCED SEARCH

(71) Applicant: International Business Machines Corporation, Armonk, NY (US)

(72) Inventors: Ali Anwar, San Jose, CA (US); Syed Amer Zawad, Reno, NV (US); Yi Zhou, San Jose, CA (US); Nathalie Baracaldo Angel, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 17/199,403

(22) Filed: Mar. 11, 2021

(65) Prior Publication Data
US 2022/0292392 A1    Sep. 15, 2022

(51) Int. Cl.
*G06F 16/00* (2019.01)
*G06N 20/00* (2019.01)
*G06F 16/2453* (2019.01)

(52) U.S. Cl.
CPC ......... *G06N 20/00* (2019.01); *G06F 16/2453* (2019.01)

(58) Field of Classification Search
CPC .............................. G06N 20/00; G06F 16/2453
See application file for complete search history.

(56) References Cited

U.S. PATENT DOCUMENTS

| | | | | |
|---|---|---|---|---|
| 11,140,099 B2* | 10/2021 | Jina | ........................ | H04L 67/306 |
| 11,416,754 B1* | 8/2022 | Durvasula | .............. | G06N 20/00 |
| 2010/0332262 A1* | 12/2010 | Horvitz | ................. | G06F 9/5072 |
| | | | | 705/26.1 |
| 2012/0060142 A1* | 3/2012 | Fliess | .................. | G06F 11/3457 |
| | | | | 717/102 |
| 2017/0176984 A1* | 6/2017 | Schmidt | ................. | G05B 17/02 |
| 2017/0213257 A1* | 7/2017 | Murugesan | ........ | G06Q 30/0275 |
| 2018/0165554 A1* | 6/2018 | Zhang | ................. | G06F 18/2411 |

(Continued)

FOREIGN PATENT DOCUMENTS

| | | |
|---|---|---|
| CN | 110363305 A | 10/2019 |
| CN | 110490335 A | 11/2019 |

(Continued)

OTHER PUBLICATIONS

Bonawitz, K., Eichner, H., Grieskamp, W., Huba, D., Ingerman, A., Ivanov, V., Kiddon, C., Konečný, J., Mazzocchi, S., McMahan, H. B., Van Overveldt, T., Petrou, D., Ramage, D., & Roselander, J. (Mar. 22, 2019). Towards federated learning at scale: System design. arXiv.org. Retrieved Feb. 25, 2022, from https://arxiv.org/abs/1902.01046.

(Continued)

*Primary Examiner* — Noosha Arjomandi
(74) *Attorney, Agent, or Firm* — Caleb Wilkes; Otterstedt & Kammer PLLC

(57) ABSTRACT

An indication of availability over time and resource usage is maintained for each computing device of a plurality of computing devices. An optimal combination of a subset of the plurality of computing devices is determined for each round of one or more rounds of training based on the availability over time and the resource usage for each computing device. A global model is generated utilizing the one or more optimal combinations of the plurality of computing devices and a query is performed utilizing the global model.

20 Claims, 10 Drawing Sheets

| A | B | C | D |
|---|---|---|---|
| 1 | 2 | 3 | 4 |

(56) References Cited

U.S. PATENT DOCUMENTS

| | | | | |
|---|---|---|---|---|
| 2018/0218134 | A1* | 8/2018 | Be'ery | H04L 63/1433 |
| 2019/0369979 | A1* | 12/2019 | Woods | G06F 16/137 |
| 2020/0027022 | A1* | 1/2020 | Jha | H04L 67/34 |
| 2020/0349161 | A1* | 11/2020 | Siddiqui | G06F 16/211 |
| 2020/0401891 | A1* | 12/2020 | Xu | G06N 3/105 |
| 2021/0117780 | A1* | 4/2021 | Malik | G06F 40/35 |
| 2021/0117823 | A1* | 4/2021 | Neumann | G16H 10/20 |
| 2021/0314523 | A1* | 10/2021 | Kamisetty | H04L 65/1069 |
| 2021/0360010 | A1* | 11/2021 | Zaccak | G06N 20/20 |
| 2021/0374502 | A1* | 12/2021 | Roth | G06N 3/08 |
| 2022/0078797 | A1* | 3/2022 | Helms | H04L 51/18 |
| 2022/0129556 | A1* | 4/2022 | Chen | G06F 21/74 |
| 2022/0207234 | A1* | 6/2022 | Moros Ortiz | G06F 40/253 |
| 2022/0284359 | A1* | 9/2022 | Lopopolo | G06Q 10/067 |
| 2022/0292392 | A1* | 9/2022 | Anwar | H04L 67/566 |

FOREIGN PATENT DOCUMENTS

| | | |
|---|---|---|
| CN | 110598870 A | 12/2019 |
| CN | 110610242 A | 12/2019 |
| CN | 110908893 A | 3/2020 |
| CN | 111212110 A | 5/2020 |
| CN | 111522669 A | 8/2020 |
| CN | 111580970 A | 8/2020 |

OTHER PUBLICATIONS

Caldas, S., Konečny, J., McMahan, H. B., & Talwalkar, A. (Jan. 8, 2019). Expanding the reach of Federated Learning by Reducing Client Resource Requirements. arXiv.org. Retrieved Feb. 25, 2022, from https://arxiv.org/abs/1812.07210.

Semi-cyclic stochastic gradient descent—arxiv.org E . . . (n.d.). Retrieved Feb. 25, 2022, from https://arxiv.org/pdf/1904.10120.pdf.

Peter Mell and Timothy Grance, The NIST Definition of Cloud Computing, NIST Special Publication 800-145, Sep. 2011, cover, pp. i-iii and 1-3.

Hard A, Rao K, Mathews R, Ramaswamy S, Beaufays F, Augenstein S, Eichner H, Kiddon C, Ramage D. Federated learning for mobile keyboard prediction. arXiv preprint arXiv:1811.03604. Nov. 8, 2018. (7 pages.).

Suzumura T, Zhou Y, Baracaldo N, Ye G, Houck K, Kawahara R, Anwar A, Stavarache LL, Watanabe Y, Loyola P, Klyashtorny D. Towards federated graph learning for collaborative financial crimes detection. arXiv preprint arXiv:1909.12946. Sep. 19, 2019. (10 pages.).

Choudhury O, Gkoulalas-Divanis A, Salonidis T, Sylla I, Park Y, Hsu G, Das A. Differential privacy-enabled federated learning for sensitive health data. arXiv 2019. arXiv preprint arXiv:1910.02578. (6 pages.).

* cited by examiner

| A | B | C | D |
|---|---|---|---|
| 1 | 2 | 3 | 4 |

*FIG. 2A*

|   | Round 1 | Round 2 | Round 3 | Round 4 | Round 5 |
|---|---|---|---|---|---|
| A | 0 | 1 | 1 | 0 | 1 |
| B | 1 | 1 | 0 | 1 | 0 |
| C | 1 | 0 | 1 | 1 | 1 |
| D | 1 | 0 | 1 | 0 | 1 |

*FIG. 2B*

|    | A | B | C | D | Var of FLO |
|----|---|---|---|---|------------|
| BC | 0 | 2 | 3 | 0 | 1.6875 |
| CD | 0 | 0 | 3 | 4 | 3.1875 |
| BD | 0 | 2 | 0 | 4 | 2.75 |

For Round 1: Least Variation, Therefore Optimal

*FIG. 2C*

For Round 2
- Possible Selections - AB Only

Up to Round 2, Selection Schedule-
Round 1-BC
Round 2-AB
Round 3.....

|    | A | B | C | D | Var of FLO |
|----|---|---|---|---|------------|
| AB | 1 | 2 | 0 | 0 | 0.6875 |

*FIG. 2D*

| A | B | C | D |
|---|---|---|---|
| 1M | 2M | 3M | 4M |

*FIG. 3A*

|   | Round 1 | Round 2 | Round 3 | Round 4 | Round 5 |
|---|---|---|---|---|---|
| A | 0 | 1 | 1 | 0 | 1 |
| B | 1 | 1 | 0 | 1 | 0 |
| C | 1 | 0 | 1 | 1 | 1 |
| D | 1 | 0 | 1 | 0 | 1 |

*FIG. 3B*

|    | A | B | C | D | Total FLO |
|----|---|---|---|---|---|
| BC | 0 | 2 | 3 | 0 | 5 |
| CD | 0 | 0 | 3 | 4 | 7 |
| BD | 0 | 2 | 0 | 4 | 6 |

*FIG. 3C*

|    | A | B | C | D | Total FLO |
|----|---|---|---|---|---|
| AB | 1 | 2 | 0 | 0 | 3 |

*FIG. 3D*

SCHEDULED FEDERATED LEARNING FOR ENHANCED SEARCH

BACKGROUND

The present invention relates to the electrical, electronic and computer arts, and more specifically, to artificial intelligence, machine learning, and the like.

Federated learning is a technique for performing machine learning to train a model based on a plurality of data sets. The data sets are privately maintained on a plurality of servers (also referred to as parties). Each party generates a model using local data, and shares the generated model with a centralized aggregator that aggregates the locally-generated models into a global model without exposing the local data.

SUMMARY

Principles of the invention provide techniques for scheduled federated learning for enhanced search. In one aspect, an exemplary method includes the operations of maintaining an indication of availability over time and resource usage for each computing device of a plurality of computing devices; determining an optimal combination of a subset of the plurality of computing devices for each round of one or more rounds of training based on the availability over time and the resource usage for each computing device; generating a global model utilizing the one or more optimal combinations of the plurality of computing devices; and performing a query utilizing the global model.

In one aspect, a computer program product for federated learning, the computer program product comprising a computer readable storage medium having program instructions embodied therewith, the program instructions executable by a computer to cause the computer to: maintain an indication of availability over time and resource usage for each computing device of a plurality of computing devices; determine an optimal combination of a subset of the plurality of computing devices for each round of one or more rounds of training based on the availability over time and the resource usage for each computing device; generate a global model utilizing the one or more optimal combinations of the plurality of computing devices; and perform a query utilizing the global model.

In one aspect, an apparatus comprises a memory, and at least one processor, coupled to said memory, and operative to perform operations comprising maintaining an indication of availability over time and resource usage for each computing device of a plurality of computing devices; determining an optimal combination of a subset of the plurality of computing devices for each round of one or more rounds of training based on the availability over time and the resource usage for each computing device; generating a global model utilizing the one or more optimal combinations of the plurality of computing devices; and performing a query utilizing the global model.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

optimizing search via scheduled federated learning;

minimizes resource usage;

minimizes resource usage biasness;

reduces selection of dropouts (unavailable parties);

increases model accuracy;

maximizes performance fairness;

reduces waste of resources and increases speed of operation by reducing the selection of dropouts and reducing resource usage variance;

maintains privacy of local data during training;

tunable parameters to prioritize the objectives;

enables the training together of thousands of smartphones or Internet-of-Things (IoT) devices; and enables enterprise federated training where groups of banks, hospitals, and the like train together to fight money laundering, diagnose illnesses, and the like.

These and other features and advantages of the present invention will become apparent from the following detailed description of illustrative embodiments thereof, which is to be read in connection with the accompanying drawings.

BRIEF DESCRIPTION OF THE DRAWINGS

FIG. 2A illustrates the relative number of floating-point operations available for each party in a first example scenario, in accordance with an example embodiment;

FIG. 2B illustrates the availability of each party during each round of training, in accordance with an example embodiment;

FIG. 2C illustrates the available combinations of parties during round 1, in accordance with an example embodiment;

FIG. 2D illustrates the possible combinations of parties during round 2, in accordance with an example embodiment;

FIG. 3A illustrates the relative number of floating-point operations available for each party in a second example scenario, in accordance with an example embodiment;

FIG. 3B illustrates the availability of each party during each round of training, in accordance with an example embodiment;

FIG. 3C illustrates the available combinations of parties during round 1, in accordance with an example embodiment;

FIG. 3D illustrates the possible combinations of parties during round 2, in accordance with an example embodiment;

DETAILED DESCRIPTION

Figure 1:
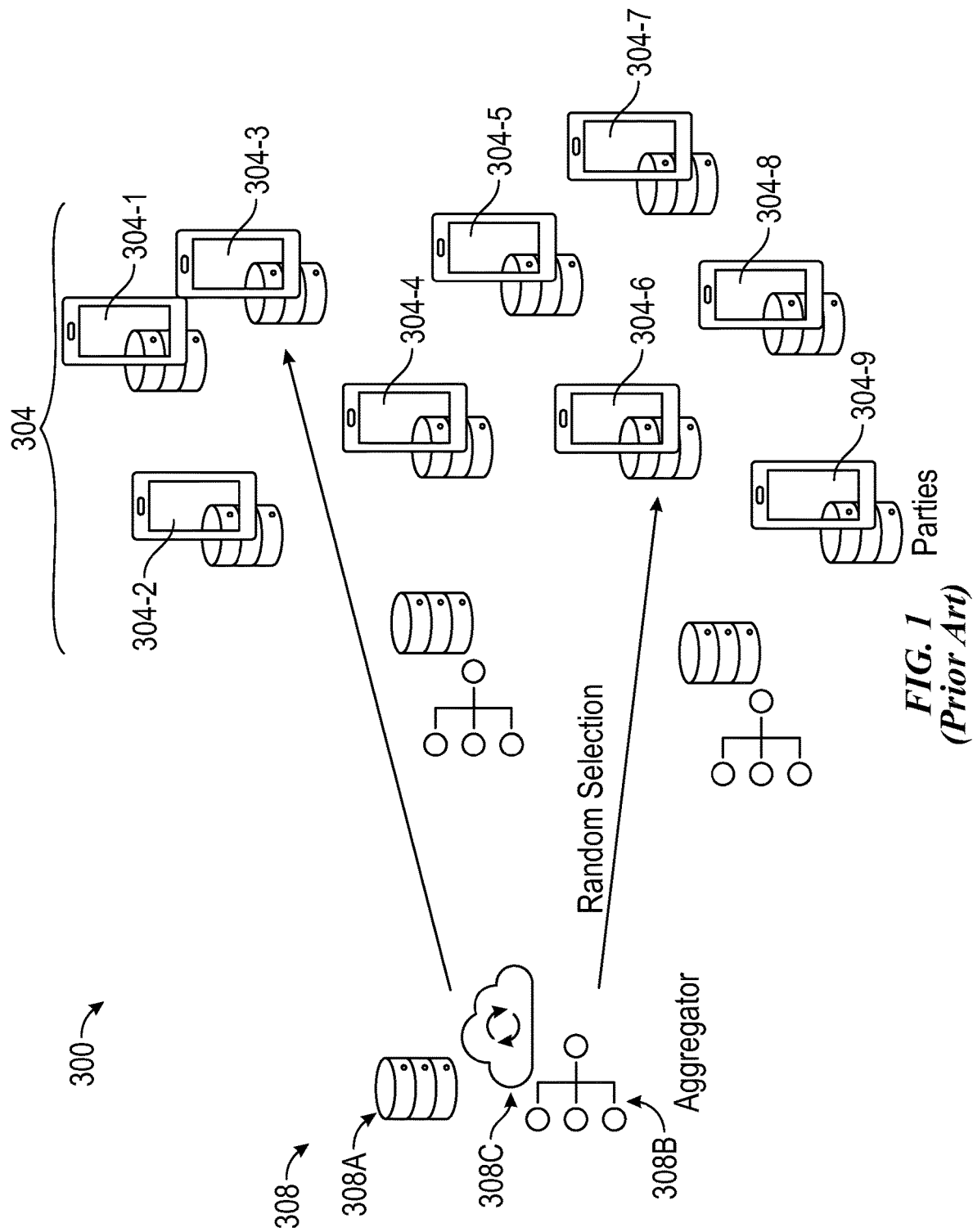
FIG. 1 illustrates a federated learning system as known from the prior art.

FIG. 1 illustrates a federated learning system 300. A plurality of servers 304-1, 304-2, 304-3, 304-4, 304-5, 304-6, 304-7, 304-8, 304-9 (also referred to as devices 304-1, 304-2, 304-3, 304-4, 304-5, 304-6, 304-7, 304-8, 304-9 and parties 304-1, 304-2, 304-3, 304-4, 304-5, 304-6, 304-7, 304-8, 304-9 and collectively referred to as parties 304 and devices 304 herein) perform model training on a local and/or global data set. The local data set is maintained securely and privately on the server(s) of the parties 304 and not shared between the parties 304. An aggregator 308 manages the training of a global model by sharing a global data set with a randomly selected set of the parties 304. In one or more embodiments, the aggregator includes a database 308A, global model storage 308B, and aggregation algorithm 308C. The three elements can be collocated in a single machine or networked together, for example.

During a first round of training, the randomly selected set of the parties 304 each generate a local model based on their local data set and the global data set provided by the aggregator 308. The local models are then shared with the aggregator 308 which generates a first version of the global model by merging or aggregating the shared local models. During a second round of training, the aggregator 308 shares the revised global model with another set of randomly selected parties 304 which each generate another version of the local model based on their local data set and the global model provided by the aggregator 308. Each set of randomly selected parties 304 may include all of the parties 304 or a proper subset of the parties 304, and may include the same parties 304 of a previous round, a proper subset of the parties 304 of a previous round, or a different set of parties 304 than the parties 304 of a previous round. This process continues for potentially thousands of rounds and ends based on various criteria. For example, the process can continue for a fixed number of rounds or can be stopped based on heuristics.

The conventional method of randomly selecting parties 304 for participation in the generation of the global model results in a number of potential problems and issues. First, "dropouts" may adversely affect the generation of the model. For example, a party 304 picked for a specific round of training may be unavailable for participation in the round due, for example, to a lack of resource availability, a lack of network connectivity, and the like. This may lead to a waste of hardware resources as the round may need to be aborted.

Second, resource usage bias may adversely affect the generation of the model in the case of resource heterogeneity. For example, one of the selected parties 304 may have substantially more resources available for training the model than another of the selected parties 304. Not only does this affect the accuracy and fairness of the model, but it may lead to wasted processing resources during training as one party 304 may complete training during a round prior to another of the selected parties 304.

Third, similar to point two, total resource usage may adversely affect the generation of the model in the case of resource heterogeneity. For example, one of the selected parties 304 may have more total resources available for training the model than another of the selected parties 304. Not only does this affect the accuracy and fairness of the model, but it may lead to wasted processing resources during training as one party 304 may complete training during a round prior to another of the selected parties 304.

Fourth, there are accuracy issues in the case of data heterogeneity. Some of the parties 304 may inherently have higher quality data than other parties 304. If the parties 304 with lower quality data are selected too often, there may be accuracy issues with the global model.

Fifth, although the selection of parties 304 may be performed randomly, some parties 304 may be selected more frequently than other parties 304, leading to a global model that may be unfairly biased toward a particular subset of the parties 304.

In one example embodiment, federated learning scheduling is performed to address, for example, one, some, or all the issues and problems outlined above. In particular, the federated learning scheduling pre-schedules devices over the training process to minimize resource usage bias, minimize resource usage, reduce selection of dropouts, increase accuracy, and maximize performance fairness. The federated learning scheduling is based, for example, on information related to future properties of the parties 304, such as a party's availability over time, a party's resource usage over time, and the like. In one example embodiment, the future properties of the parties 304 are provided by each party 304. In one example embodiment, the future properties of the parties 304 are determined by profiling each party 304 and then predicting the future properties of each party 304. For example, availability trends for each party 304 may be recognized and used to predict the future availability of the party 304. There are also techniques available for predicting the future resource usage of each party 304.

In one example embodiment, dynamic programming is used to chart all possible combinations of party selection over n rounds and the combinations that have the least resource usage bias are selected. A resource usage metric is defined based on, for example, floating point operations that will be used for each round by each party 304 and a bias metric based, for example, on a resource used per device variance. For example, consider a first round of training (Round 1) where the system includes four parties 304 labeled A, B, C, and D. The training plan is to run five rounds with two devices selected per round. FIG. 2A illustrates the relative number of floating-point operations available for each party 304 in a first example scenario, in accordance with an example embodiment. As illustrated in FIG. 2A, party A has 1 unit of floating-point operations per second, party B has 2 units of floating-point operations per second, party C has 3 units of floating-point operations per second, and party D has 4 units of floating-point operations per second. FIG. 2B illustrates the availability of each party 304 during each round of training, in accordance with an example embodiment. A "0" indicates that the party 304 is not available during the corresponding round and a "1" indicates that the party 304 is available during the corresponding round. As illustrated in FIG. 2B, party A is available during rounds 2, 3, and 5; party B is available during rounds 1, 2, and 4; party C is available during rounds 1, 3, 4, and 5; and party D is available during rounds 1, 3, and 5.

FIG. 2C illustrates the available combinations of parties 304 during round 1, in accordance with an example embodiment. Based on the availability of parties B, C, D during round 1, the available combinations are B-C, C-D, and B-D. Given the objective function of minimizing the variance (argmin var(Resource usage per device)), based on the resource availability for all of the parties 304, as illustrated in FIG. 2C, the variance of floating-point operations 1.6875 for the B-C combination, the variance of floating point operations 3.1875 for the C-D combination, and the variance of floating point operations 2.75 for the B-D combination. Thus, the best combination in terms of availability and resource bias (lower variance) is B-C.

FIG. 2D illustrates the possible combinations of parties 304 during round 2, in accordance with an example embodiment. Based on the availability of parties A, B during round 2, the only available combination is A-B. Based on the resource availability for each party 304 that is available, as illustrated in FIG. 2D, the variance of floating-point operations is 0.6875 for the A-B combination. Thus, the best, and only, combination in terms of availability and resource bias (variance) is A-B.

FIG. 3A illustrates the relative number of floating-point operations available for each party 304 in a second example scenario, in accordance with an example embodiment. For example, consider a first round of training (Round 1) where the system includes four parties 304 labeled A, B, C, and D. The training plan is to run five rounds with two devices selected per round. As illustrated in FIG. 3A, party A has 1M (million) floating point operations per second, party B has 2M floating point operations per second, party C has 3M floating point operations per second, and party D has 4M floating point operations per second. FIG. 3B illustrates the availability of each party 304 during each round of training, in accordance with an example embodiment. A "0" indicates that the party 304 is not available during the corresponding round and a "1" indicates that the party 304 is available during the corresponding round. As illustrated in FIG. 3B, party A is available during rounds 2, 3, and 5; party B is available during rounds 1, 2, and 4; party C is available during rounds 1, 3, 4, and 5; and party D is available during rounds 1, 3, and 5.

FIG. 3C illustrates the available combinations of parties 304 during round 1, in accordance with an example embodiment. Based on the availability of parties B, C, D during round 1, the available combinations are B-C, C-D, and B-D. Given the objective function of total resources used for the round (argmin sum (Resource usage per device)) and based on the total resource availability for each party 304, as illustrated in FIG. 3C, the sum of floating-point operations per second is 5M for the B-C combination, 7M for the C-D combination, and 6M for the C-D combination. Thus, the best (lowest) combination based on total resources consumed is B-C.

FIG. 3D illustrates the possible combinations of parties 304 during round 2, in accordance with an example embodiment. Based on the availability of parties A, B during round 2, the only available combination is A-B. Based on the total resource availability for each party 304, as illustrated in FIG. 3D, the total number of floating-point operations per second is 3M for the A-B combination. Thus, the best, and only, combination in terms of availability and total resource availability is A-B.

In the above scenarios, the selected combination was the same, B-C, for the given round (round 1). The selected combinations, however, may not be the same for a particular round, leading to a scheduling conflict. In one example embodiment, a multi-objective optimization is performed to address scheduling conflicts, such as how to handle a conflict between a total resource minimization schedule and a biased resource minimization schedule. In one example embodiment, the parameters are weighted according to a multi-objective function. For example, an objective function may be defined as:

$$\text{argmin}(w_1*\text{sum(Resource Usage per Device)}+w_2*\text{var (Resource Usage per Device)})$$

Assuming $w_1=1$ and $w_2=5$, the above function is calculated as follows:

Combination $B\text{-}C$: $5*1.673+1*3=11$

Combination $C\text{-}D$: $5*1.062+1*4=9$

Combination $B\text{-}C$: $5*2.626+1*5=18$

Note that the weights are normalized in one or more embodiments (weights can be used to normalize the parameters).

Based on the above calculations, the optimal combination (smallest number of resources and smallest variance) is C-D.

The above technique, through dynamic programming and availability data, results in the device selection schedule a specified number of rounds in advance. With memoization, the data after one full combination tree traversal can be stored. In other words, every possible combination of devices is mapped out for the next N rounds, where N is set, for example, by a system administrator. Once the training reaches round N, the next N rounds are mapped out and so on, until convergence. The value of N depends on the amount of overhead that system engineers are willing to tolerate. The more rounds that are mapped out, the more computationally expensive it is. The scheduler, however, only focuses on resource consumption while reducing dropouts. These calculations may be performed in advance.

Accuracy

In general, all parties 304 do not contribute equally to training the global model. To achieve better accuracy for all parties 304, better contributing parties 304 should be prioritized during the selection process. Unfortunately, the contribution of every party 304 is not known beforehand. "Good" parties 304 use local data sets such that training locally on the local data set yields a local model which performs well on a small unbiased (independent and identically distributed (IID)) sampled evaluation data set.

Fairness

All parties 304 do not benefit equally from the global model. For example, some parties 304 may be selected less frequently during training than other parties 304, leading to a global model that is less fair. To achieve better fairness, the global model should perform well on every device of the parties 304. The fairness of the global model changes over rounds.

In one example embodiment, to measure the performance contribution of a given device of a party 304, the global model is tested using test data sets sampled from the local device data. The variance of test accuracies, i.e., the difference of local test data accuracies between parties 304 can be used to measure bias.

Figure 4A:
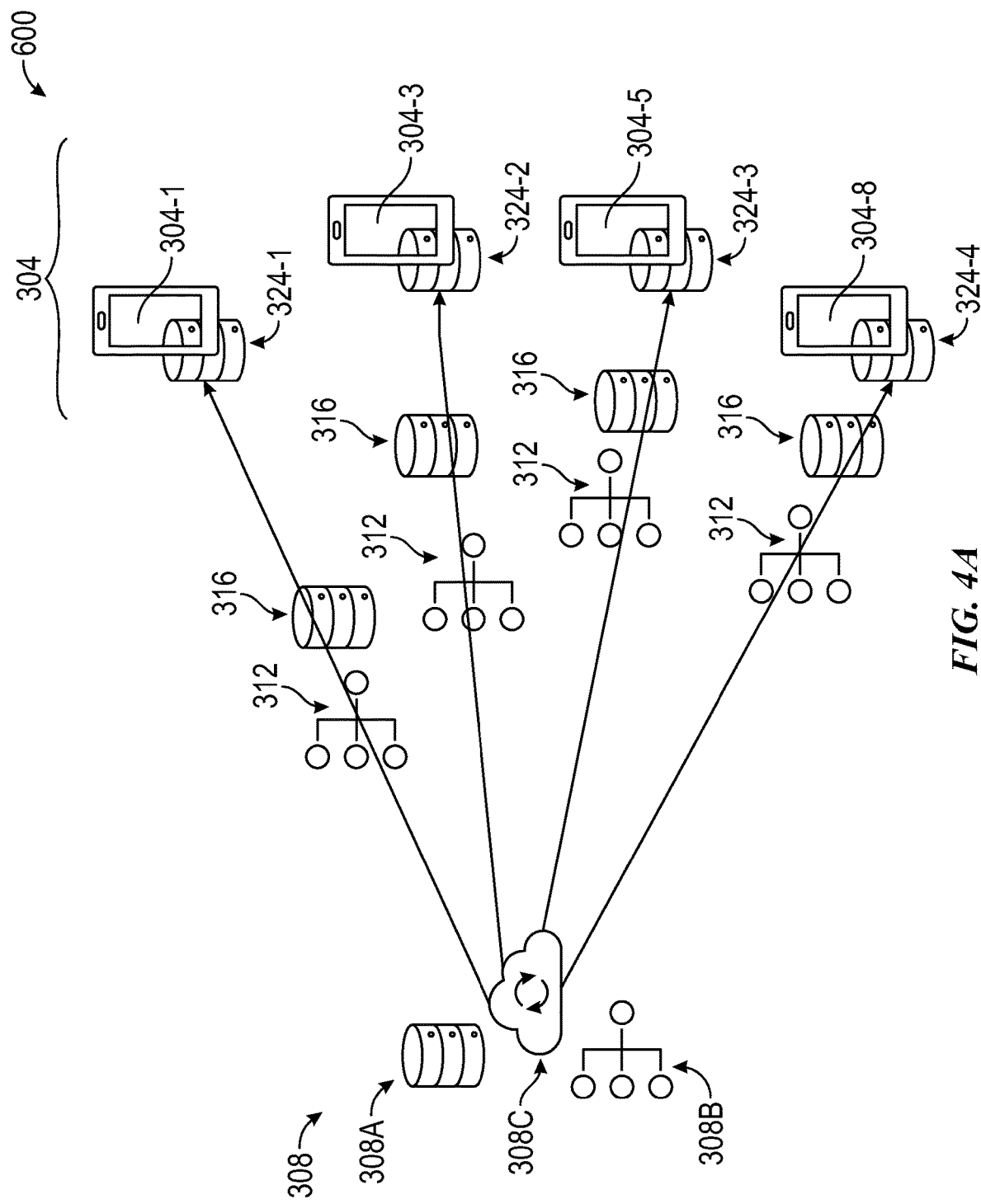
FIG. 4A illustrates an example federated learning system, in accordance with an example embodiment.

FIG. 4A illustrates an example federated learning system 600, in accordance with an example embodiment. The federated learning system 600 enables participants (parties 304) to utilize their local data 324-1, 324-2, 324-3, 324-4 in the generation of a global model 312 while protecting the privacy of the information. For example, areas such as healthcare, banking, and IoT environments are often subject to legislation that protect such data. The federated learning system 600 provides functionality that enables higher accuracy models and provides concrete privacy guarantees. The federated learning system 600 enables clients to collaboratively generate machine learning models with privacy guarantees, without requiring data to be shared and protecting against the information from malicious attacks.

Figure 4B:
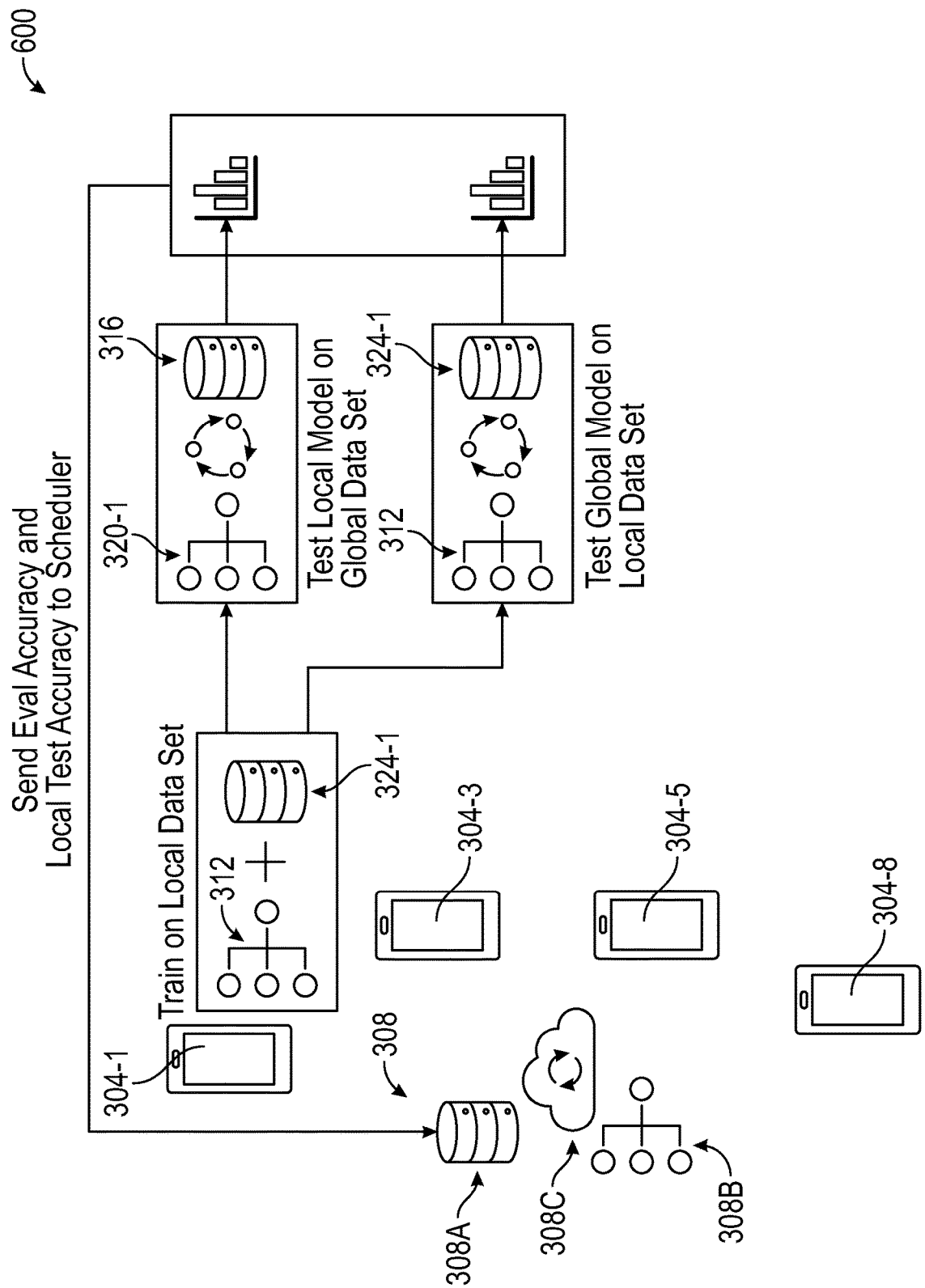
FIGS. 4B and 4C illustrate an example training and testing workflow using the federated learning system, in accordance with an example embodiment.
Figure 4C:
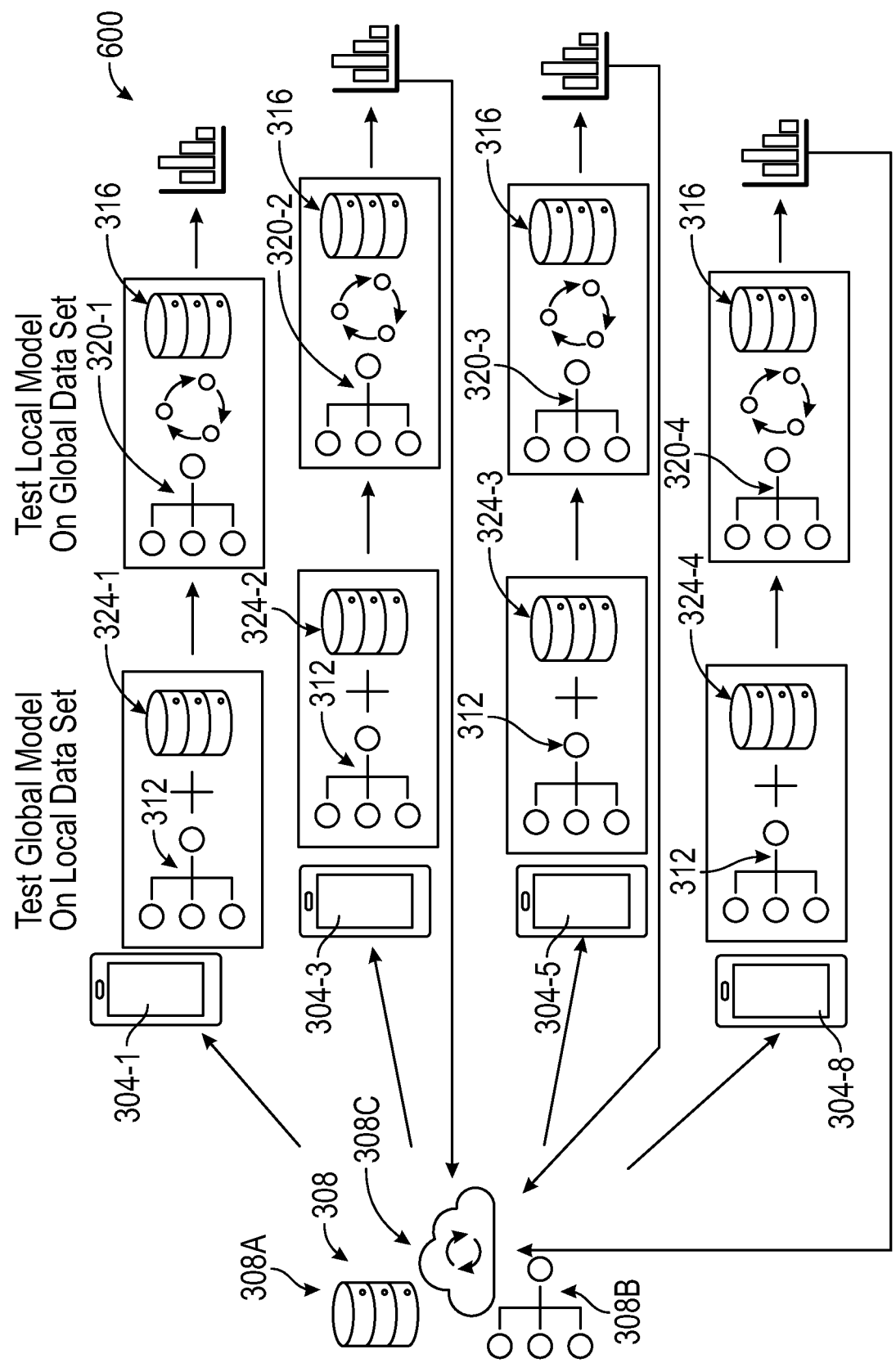

In one example embodiment, a global evaluation data set 316 and global model 312 are distributed to all of the parties 304 of the federated learning system 600. FIGS. 4B and 4C illustrate an example training and testing workflow using the federated learning system 600, in accordance with an example embodiment. As illustrated in FIG. 4B, the selected parties, such as selected party 304-1, train a local model, such as local model 320-1, based on the local data set, such as local data set 324-1, and then test the local model 320-1 using the global evaluation data set 316 and test the global model 312 using the corresponding local data set, such as local data set 324-1. As illustrated in FIG. 4C, the selected parties 304-1, 304-3, 304-5, 304-8 send the resulting global evaluation accuracy and the local test accuracy to the aggregator 308. The local test accuracy of the global model 312 shows how much the global model 312 is biased for or against the corresponding party 304-1, 304-3, 304-5, 304-8 and the global evaluation accuracy of the local model 320-1, 320-2, 320-3, 320-4 shows how well the locally trained model performs compared to the models of other parties 304. The workflow of FIGS. 4A-4C is performed for all parties 304.

In one example embodiment, the parties 304 are ranked based on biasness:

Biasness_Rank=SortAscending([Device Local Test Accuracies])

The lowest to highest accuracies represent the global model 312 being biased against and biased towards the corresponding party 304. The Biasness_Rank determines the Biasness_Priority per Device.

In one example embodiment, the parties 304 are ranked based on local device performance:

Performance_Rank=SortDescending([Device Global Eval Accuracies])

The highest accuracy devices are recognized as having the "best" local data sets 324-1, 324-2, 324-3, 324-4. The Performance_Rank determines the Performance_Priority per Device.

The two rankings are then considered in determining the combination of parties 304 to use during the next round, as described more fully below.

Accuracy Biasness

In one example embodiment, a device priority value is assigned:

$$\text{device priority value} = \frac{\text{Rank}}{n(n-1)/2}$$

where n=the total number of devices for each party 304 for both metrics.

Multi-Objective Weighted Dynamic Programming

In one example embodiment, a weighted objective function is used to rank the available combinations of parties 304 based on resource usage, biasness, and the like:

argmin $w_1$*sum(Resource Usage per Device)+$w_2$*var (Resource Usage per Device)+$w_3$*sum(Biasness_Priority per Device)+$w_4$*sum(Performance_Priority per Device)

In one example embodiment, $w_1$, $w_2$, $w_3$, and $w_4$ are set by the user based, for example, on the importance of the corresponding parameter to the user. In one example embodiment, the value of each weight is based on the importance of each metric and the four weights sum to 1. For example, if the priority is to reduce to overall resource usage, the weights can be 0.5, 0.2, 0.2, 0.1 for w1, w2, w3, w4 respectively. If the intention is to have a fairer model, the weights can be 0.1, 0.2, 0.2, 0.5 for w1, w2, w3, w4 respectively. The objective function is evaluated for each available combination of parties 304 and the combinations of parties 304 are ranked based upon the results of the evaluation of the objective function for each round.

Figure 5:
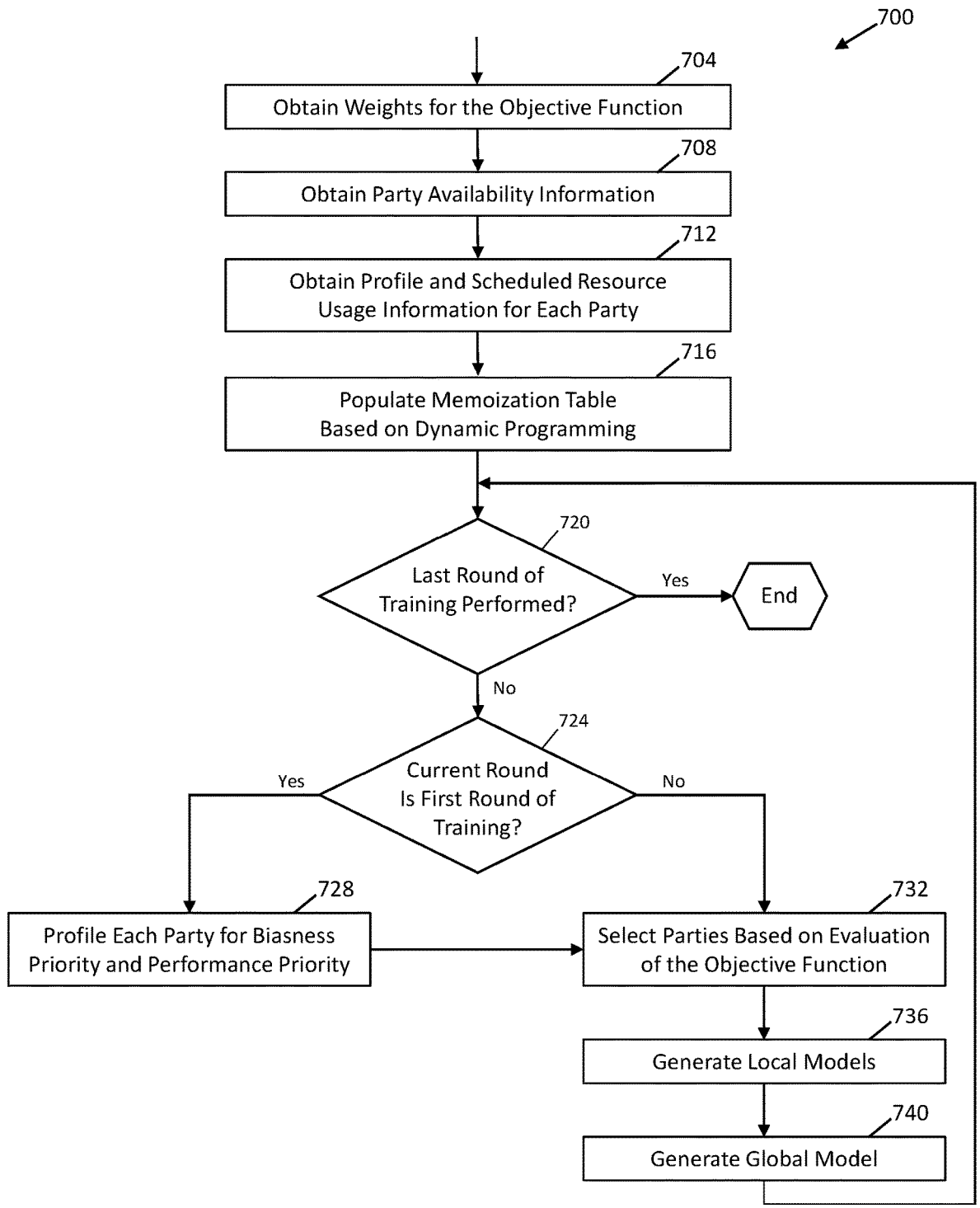
FIG. 5 is an example method for performing federated learning scheduling, in accordance with an example embodiment.

FIG. 5 is an example method 700 for performing federated learning scheduling, in accordance with an example embodiment. In one example embodiment, the objective weights for the weighted objective function are set (operation 704). The availability over time for each party 304 is obtained (operation 708). The profile and scheduled resource usage for each party 304 is obtained (operation 712) and the memoization tables (see FIGS. 2C and 3C) are populated based on dynamic programming (operation 716). A check is then performed to determine if the last round of training has been performed (decision block 720). If the last round of training has been performed, the method 700 ends; otherwise, a check is performed to determine if the current round is the first round of training (decision block 724). If the current round is the first round (YES branch), each party 304 is profiled for biasness priority and performance priority (operation 728) and the method proceeds with operation 732; otherwise (NO branch) proceed directly to operation 732. In operation 732, two or more parties 304 are selected based on the evaluation of the objective function. The selected combinations of parties 304 are trained (operation 736), a global model 312 is generated in step 740, and the method 700 proceeds with decision block 720.

Given the discussion thus far, it will be appreciated that, in general terms, an exemplary method, according to an aspect of the invention, includes the operations of maintaining an indication of availability over time and resource usage for each computing device 304 of a plurality of computing devices 304 (operations 708 and 712); determining an optimal combination of a subset of the plurality of computing devices 304 for each round of one or more rounds of training based on the availability over time and the resource usage for each computing device 304 (operation 732); generating a global model 312 utilizing the one or more optimal combinations of the plurality of computing devices 304 (operation 740); and performing a query utilizing the global model 312.

In one example embodiment, the one or more optimal combinations of the plurality of computing devices 304 are scheduled for training over time. In one example embodiment, the scheduling is based on a cost model, the cost model based on one or more of resource bias, availability, accuracy, and fairness. In one example embodiment, an importance of a contribution to the global model 312 by a given computing device 304 is determined. In one example embodiment, a scheduling table based on the availability over time of the plurality of computing devices 304 is maintained. In one example embodiment, dynamic programming is used to identify all combinations of available computing devices 304 over time.

In one example embodiment, resource usage and biasness for each combination of the plurality of computing devices 304 are measured. In one example embodiment, a priority of a given computing device 304 is determined based on its local training data. In one example embodiment, a model performance and a model biasness of the global model 312 are determined. In one example embodiment, generating the global model 312 further comprises generating, by each selected computing device 304, a local model 320-1, 320-2, 320-3, 320-4 based on a corresponding local data set 324-1, 324-2, 324-3, 324-4 and a global data set 316, the global data set 316 being provided by an aggregator 308; and submitting the local model 320-1, 320-2, 320-3, 320-4 to the aggregator 308. In one example embodiment, the generating of the global model 312 further comprises generating, by the aggregator 308, a revised global model 312 based on the submitted local models 320-1, 320-2, 320-3, 320-4 and sharing, by the aggregator 308, the revised global model 312 with another set of selected computing devices 304. In one example embodiment, the determining of the optimal combination further comprises determining all possible combinations of available computing devices 304 over n rounds.

In one example embodiment, the determining of the optimal combination further comprises selecting a combination having one of a smallest resource usage bias, a smallest resource used per device variance, and a smallest resource usage. In one example embodiment, the global model 312 are tested by each computing device 304 using test data sets sampled from a corresponding local data set 324-1, 324-2, 324-3, 324-4 and the resulting local test accuracy are sent by each computing device 304 to an aggregator 308. In one example embodiment, the computing devices 304 are ranked based on the local test accuracy, wherein a high accuracy indicates that the global model 312 is biased towards the corresponding computing device 304. In one example embodiment, the local model 320-1, 320-2, 320-3, 320-4 is tested by each computing device 304 using a global evaluation data set and the resulting global evaluation accuracy is sent by each computing device 304 to an aggregator 308. In one example embodiment, the computing devices 304 are ranked based on the global evaluation accuracy, wherein a high accuracy indicates that the corresponding computing device 304 has a superior local data set 324-1, 324-2, 324-3, 324-4.

In one example embodiment, the determining of the optimal combination is based on a weighted objective function:

$$\operatorname{argmin} w_1*\text{sum}(\text{Resource Usage per Device})+w_2*\text{var}(\text{Resource Usage per Device})+w_3*\text{sum}(\text{Biasness\_Priority per Device})+w_4*\text{sum}(\text{Performance}_{Priority}\text{Per Device}),$$

wherein the Biasness_Priority per Device is based on a ranking of the computing devices 304 based on local test accuracy, wherein the Performance$_{priority}$per Device is based on a ranking of the computing devices 304 based on global evaluation accuracy, and wherein $w_1$, $w_2$, $w_3$, $w_4$ are assigned weights.

In one aspect, a non-transitory computer readable medium comprises computer executable instructions which when executed by a computer cause the computer to perform the method of maintaining an indication of availability over time and resource usage for each computing device 304 of a plurality of computing devices 304 (operations 708 and 712); determining an optimal combination of a subset of the plurality of computing devices 304 for each round of one or more rounds of training based on the availability over time and the resource usage for each computing device 304 (operation 732); generating a global model 312 utilizing the one or more optimal combinations of the plurality of computing devices 304 (operation 740); and performing a query utilizing the global model 312.

In one aspect, an apparatus comprises a memory, and at least one processor, coupled to said memory, and operative to perform operations comprising maintaining an indication of availability over time and resource usage for each computing device 304 of a plurality of computing devices 304 (operations 708 and 712); determining an optimal combination of a subset of the plurality of computing devices 304 for each round of one or more rounds of training based on the availability over time and the resource usage for each computing device 304 (operation 732); generating a global model 312 utilizing the one or more optimal combinations of the plurality of computing devices 304 (operation 740); and performing a query utilizing the global model 312.

In view of the foregoing, the skilled artisan will appreciate that the disclosed techniques for generating the global model 312 are applicable to a variety of practical applications. In one example embodiment, a method for generating the global model 312 is incorporated into a financial transaction detection system where the global model 312 is used to detect improper financial transactions. The global model 312 is collaboratively trained by different banks using corresponding computing devices 304 and the bank's customer data (equivalent to local data set 324-1, 324-2, 324-3, 324-4) while maintaining user privacy. The global model 312 is shown to be more effective than standard detection techniques. In one example embodiment, a user's transaction history is entered as a query and the global model 312 is used to generate a set of flags, where each flag represents a type of suspected improper financial transaction.

In one example embodiment, a method for generating the global model 312 is incorporated into a medical management system where the global model 312 is used to determine a patient's mortality rate, identify and/or prevent an adverse drug reaction, and the like. Multiple data banks (equivalent to local data set 324-1, 324-2, 324-3, 324-4) containing siloed patient data from hospitals or other medical entities collectively participate in the cloud federated learning to train a deep learning model (global model 312) that predicts health outcomes. Specifically, the query input data contains patient information (handled in accordance with applicable privacy laws), such as demographics, habits, diagnosis codes, prescription history, admissions records and test results. A sufficiently trained global model 312 determines a patient's mortality rate, identifies an adverse drug reaction (or potential adverse drug reaction), and the like. In one example embodiment, the output generated by the global model 312 includes a recommended alternative medication when an adverse drug reaction (or potential adverse drug reaction) is identified, and the patient is treated with the alternative medication instead of the originally planned medication, to reduce the chances of an adverse reaction.

In one example embodiment, a method for generating the global model 312 is incorporated into a keyboard prediction system where the global model 312 is used to perform autocomplete or fix typos. A user's text typing history on a computing device 304, such as a cellphone, is used to train a local model 320-1, 320-2, 320-3, 320-4 that predicts the next most probable word. The keyboard prediction system trains local models 320-1, 320-2, 320-3, 320-4 on thousands of computing devices 304 and local data sets 324-1, 324-2, 324-3, 324-4, and then aggregates the local models 320-1, 320-2, 320-3, 320-4 via the aggregator 308 over many iterations to eventually generate a complete global model 312. The global model 312 is used to suggest a set of possible characters to complete a word based on a set of initially typed characters.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
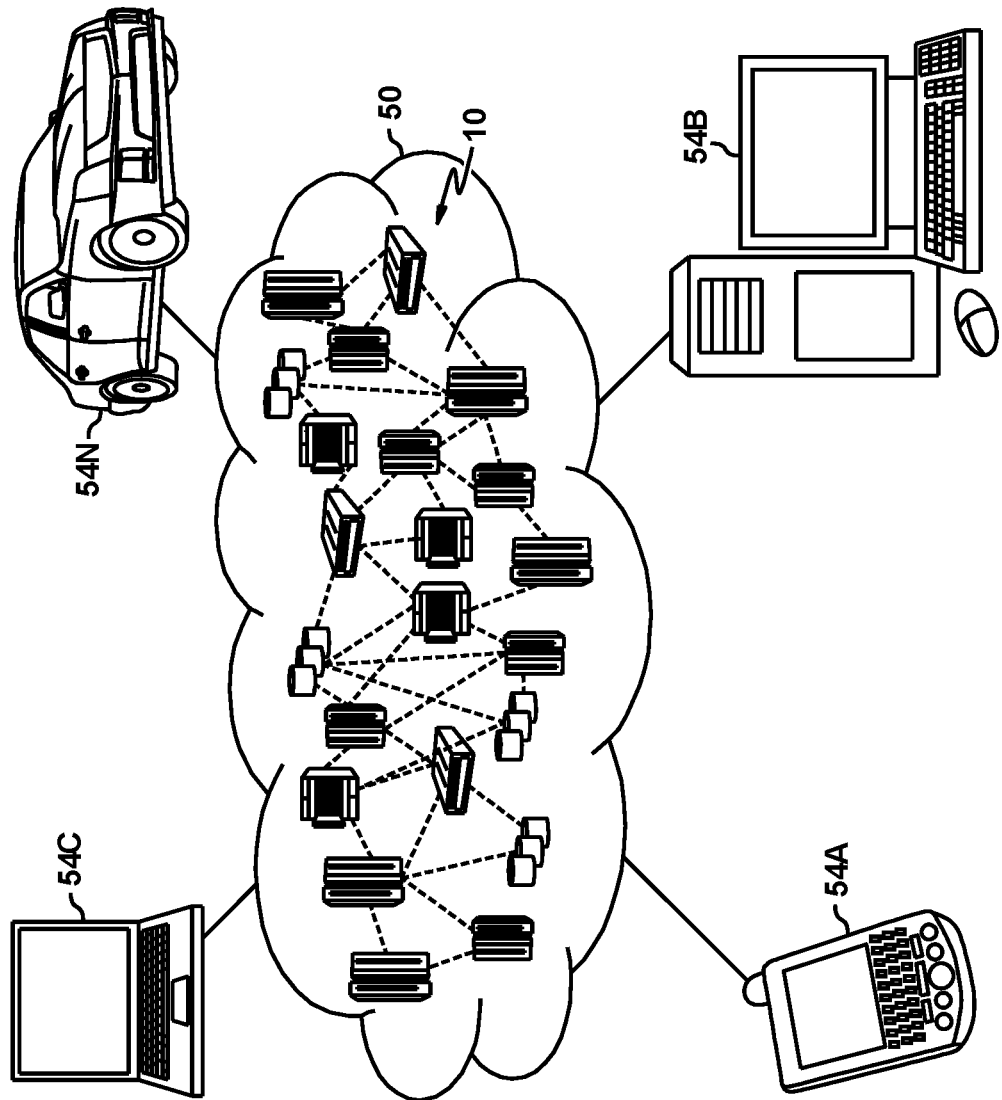
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
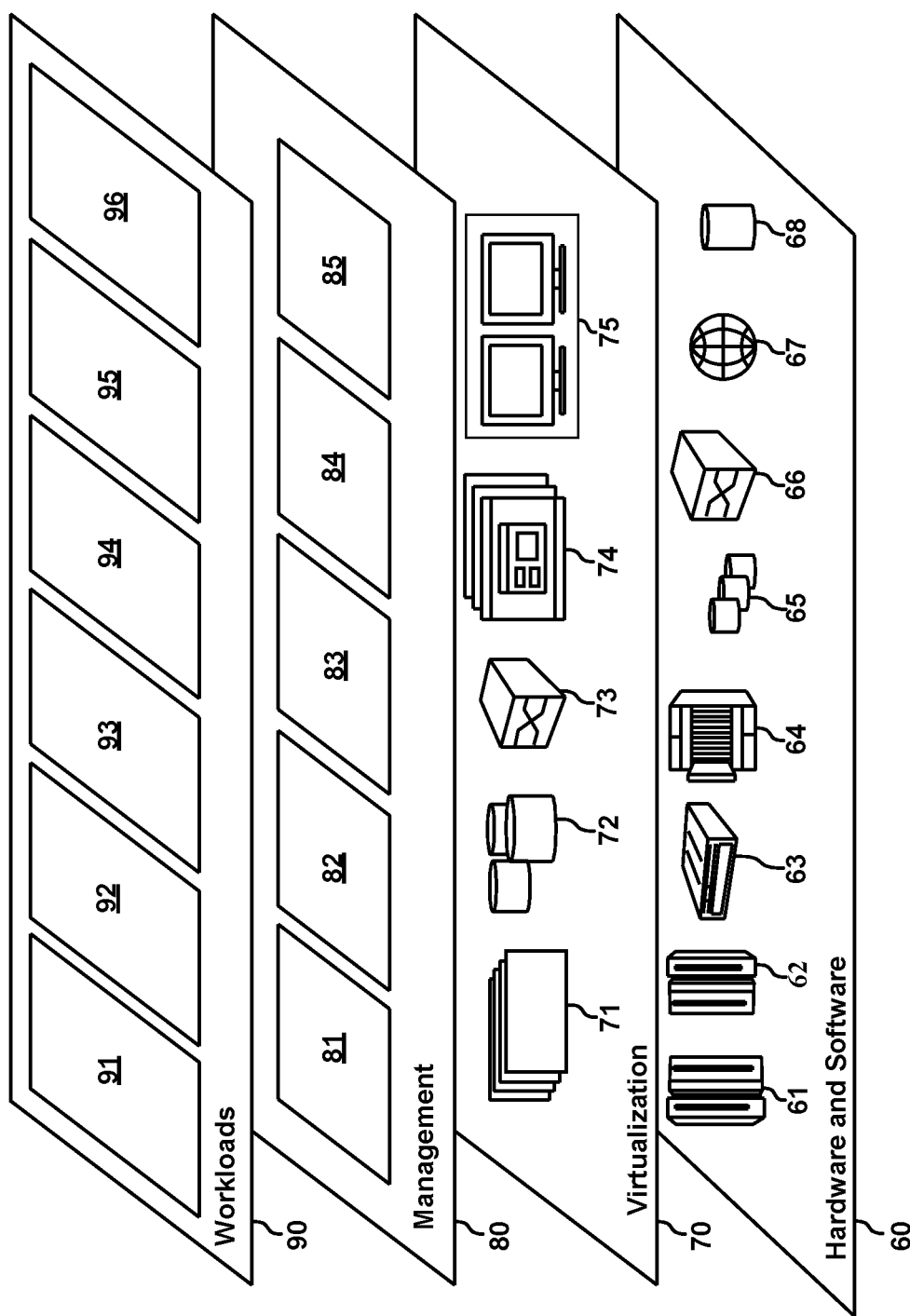
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and federated learning scheduler 96.

Figure 8:
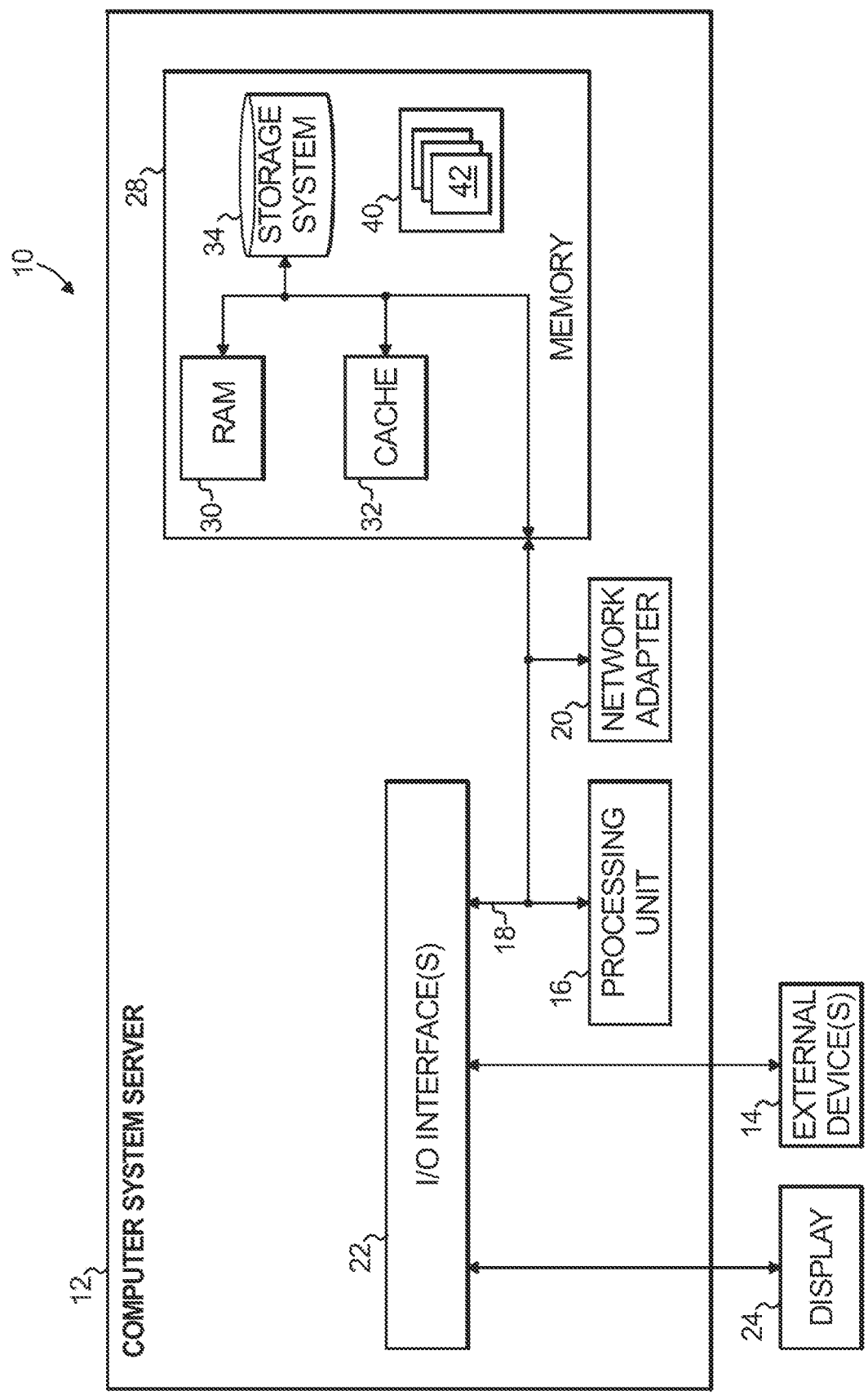
FIG. 8 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 6-7 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   maintaining an indication of availability over time and resource usage for each computing device of a plurality of computing devices;
   determining an optimal combination of a subset of the plurality of computing devices for each round of one or more rounds of training based on the availability over time and the resource usage for each computing device;
   generating a global model utilizing the one or more optimal combinations of the plurality of computing devices; and
   performing a query utilizing the global model.

2. The method of claim 1, further comprising scheduling the one or more optimal combinations of the plurality of computing devices for training over time.

3. The method of claim 2, wherein the scheduling is based on a cost model, the cost model based on one or more of resource bias, availability, accuracy, and fairness.

4. The method of claim 1, further comprising determining an importance of a contribution to the global model by a given computing device.

5. The method of claim 1, further comprising maintaining a scheduling table based on the availability over time of the plurality of computing devices.

6. The method of claim 1, wherein the determining the optimal combination further comprises using dynamic programming to identify all combinations of available computing devices over time.

7. The method of claim 6, further comprising measuring resource usage and biasness for each combination of the plurality of computing devices.

8. The method of claim 1, further comprising determining a priority of a given computing device for participating in a round of training based on its local training data.

9. The method of claim 1, wherein the generating the global model further comprises determining a model performance and a model biasness of the global model.

10. The method of claim 1, wherein generating the global model further comprises:
    generating, by each selected computing device, a local model based on a corresponding local data set and a global data set, the global data set being provided by an aggregator; and
    submitting the local model to the aggregator.

11. The method of claim 10, wherein the generating of the global model further comprises generating, by the aggregator, a revised global model based on the submitted local models and sharing, by the aggregator, the revised global model with another set of selected parties.

12. The method of claim 1, wherein the determining of the optimal combination further comprises determining all possible combinations of available computing devices over a given number of rounds.

13. The method of claim 12, wherein the determining of the optimal combination further comprises selecting a combination having one of a smallest resource usage bias, a smallest resource used per device variance, and a smallest resource usage.

14. The method of claim 1, wherein the generating the global model further comprises testing, by each computing device, the global model, using test data sets sampled from a corresponding local data set and sending, by each computing device, the resulting local test accuracy to an aggregator.

15. The method of claim 14, wherein the generating the global model further comprises ranking the computing devices based on the local test accuracy, wherein a high accuracy indicates that the global model is biased towards the corresponding computing device.

16. The method of claim 1, wherein the generating the global model further comprises testing, by each computing device, the local model using a global evaluation data set and sending, by each computing device, the resulting global evaluation accuracy to an aggregator.

17. The method of claim 16, wherein the generating the global model further comprises ranking the computing devices based on the global evaluation accuracy, wherein a high accuracy indicates that the corresponding computing device has a superior local data set.

18. The method of claim 1, wherein the determining of the optimal combination is based on a weighted objective function:

$$\text{argmin } w_1*\text{sum(Resource Usage per Device)}+w_2*\text{var(Resource Usage per Device)}+w_3*\text{sum(Biasness\_Priority per Device)}+w_4*\text{sum(Performance}_{Priority}\text{Per Device)},$$

wherein the Biasness_Priority per Device is based on a ranking of the computing devices based on local test accuracy, wherein the Performance$_{priority}$ per Device is based on a ranking of the computing devices based on global evaluation accuracy, and wherein $w_1, w_2, w_3, w_4$ are assigned weights.

19. A computer program product for federated learning, the computer program product comprising a computer readable storage medium having program instructions embodied therewith, the program instructions executable by a computer to cause the computer to:
    maintain an indication of availability over time and resource usage for each computing device of a plurality of computing devices;
    determine an optimal combination of a subset of the plurality of computing devices for each round of one or more rounds of training based on the availability over time and the resource usage for each computing device;
    generate a global model utilizing the one or more optimal combinations of the plurality of computing devices; and
    perform a query utilizing the global model.

20. An apparatus comprising:
    a memory; and
    at least one processor, coupled to said memory, and operative to perform operations comprising:
        maintaining an indication of availability over time and resource usage for each computing device of a plurality of computing devices;
        determining an optimal combination of a subset of the plurality of computing devices for each round of one or more rounds of training based on the availability over time and the resource usage for each computing device;
        generating a global model utilizing the one or more optimal combinations of the plurality of computing devices; and
        performing a query utilizing the global model.

* * * * *